Figure 1:
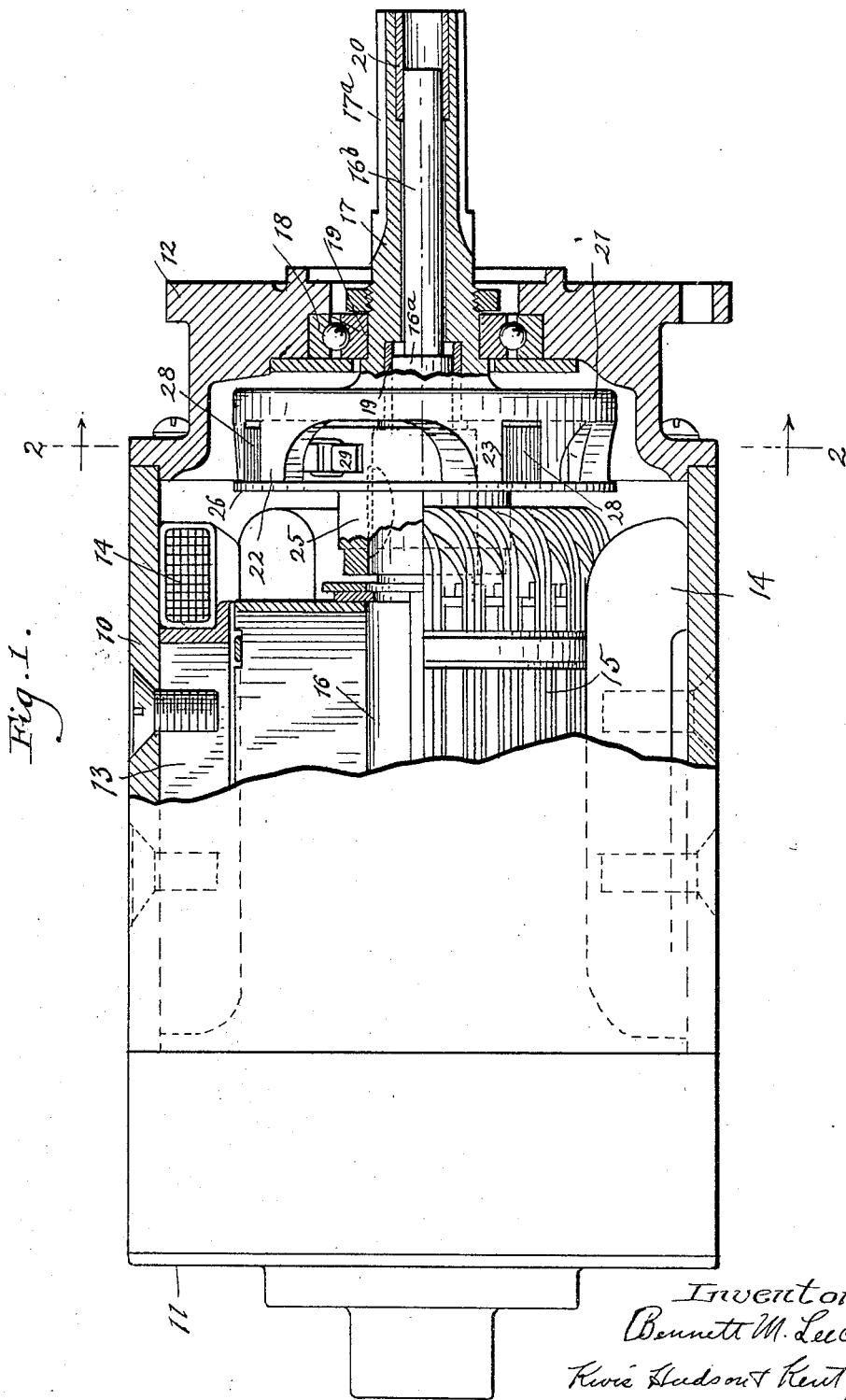

Aug. 30, 1932.  B. M. LEECE  1,875,040
GENERATOR DRIVE
Filed Oct. 7, 1926  2 Sheets-Sheet 1

Inventor
Bennett M. Leece
Rivié Hudson & Kent
Attys

Aug. 30, 1932.  B. M. LEECE  1,875,040
GENERATOR DRIVE
Filed Oct. 7, 1926  2 Sheets-Sheet 2
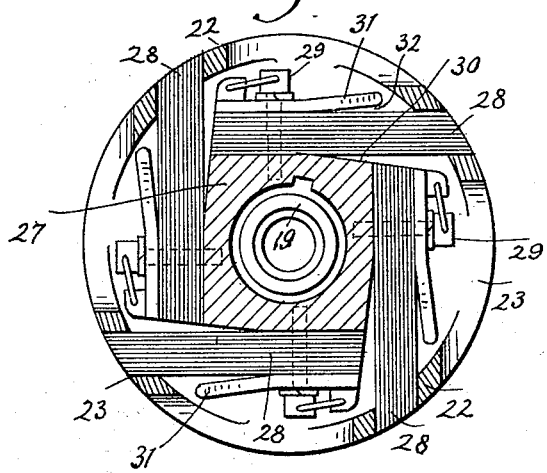
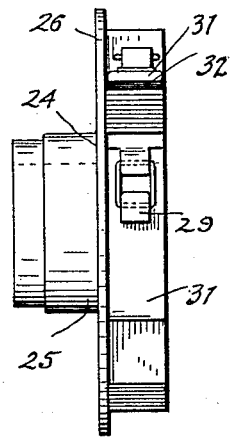
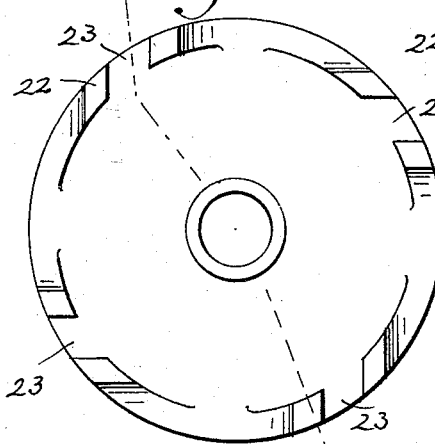
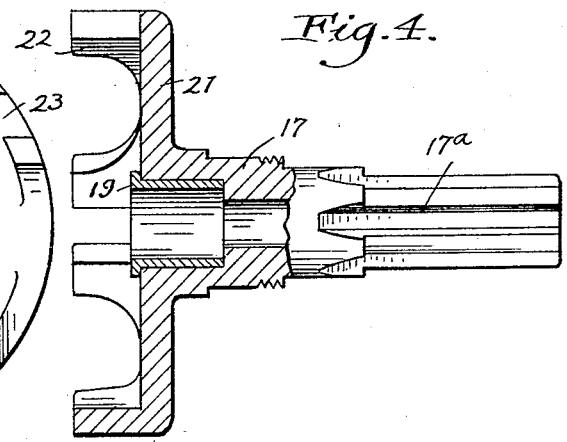
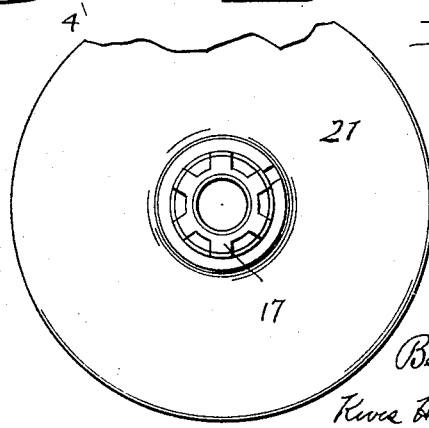
Inventor
Bennett M. Leece
Kwis Hudson & Kent
Attys.

Patented Aug. 30, 1932

1,875,040

UNITED STATES PATENT OFFICE

BENNETT M. LEECE, OF CLEVELAND, OHIO, ASSIGNOR TO THE LEECE-NEVILLE COMPANY, OF CLEVELAND, OHIO, A CORPORATION OF OHIO

GENERATOR DRIVE

Application filed October 7, 1926. Serial No. 140,057.

This invention relates to a generator drive adapted particularly for airplane use and analogous uses wherein there is considerable variation in speed of the generator driving motor, and, therefore, sudden changes in the driving torque.

In equipping airplanes with generators used for ignition and battery charging purposes considerable difficulty had been experienced in providing a drive or driving connection between the engine and the generator which would successfully withstand the strain imposed on the driving shaft in overcoming the inertia of the generator armature when the engine speed increases and in resisting the momentum of the generator armature when the engine speed decreases, the armature then tending to run ahead of the driving shaft.

A drive which answers all the requirements for the severe use encountered in airplane installations is obtained by the present invention which involves a two part shaft telescopically arranged and supported in one of the housings of the generator frame and a coupling inside of the housing and composed of yieldingly connected parts attached respectively to the two parts of the shaft.

The invention may be further briefly summarized as consisting of certain novel details of construction and combinations and arrangements of parts which will be described in the specification and set forth in the appended claims.

In the accompanying sheet of drawings illustrating the preferred embodiment of the invention, Fig. 1 shows a generator partly in elevation and partly in section and equipped with my improved drive; Fig. 2 is a sectional view through the coupling substantially along the line 2—2 of Fig. 1; Fig. 3 is a side view of one of the parts of the coupling; Fig. 4 is a view partly in side elevation and partly in section of the companion element of the coupling along the line 4—4 Fig. 5; Fig. 5 is a face view of the same looking toward the right of Fig. 4, and Fig. 6 is an opposite face view looking toward the left of Fig. 4.

Referring now to the drawings, while the details of the generator itself are not material to the present invention the generator generally comprises a cylindrical steel frame 10 with end housings 11 and 12 having bearings which support the generator shaft. The field member 10 has pole pieces 13 attached to it, these being surrounded by field coils 14. The armature which is shown at 15 partly in section and partly in elevation is secured to a shaft 16 which at the driving end shown at the right-hand side of Fig. 1 is especially supported and otherwise formed to embody the present improvements as will now be explained.

The shaft 16 is formed in two relatively movable telescopically arranged sections including a main portion designated 16 and a hollow driving section 17 having a splined outer end 17a projecting beyond the end housing 12 and adapted to receive a suitable driving member which will be connected to the crank shaft of the engine. This driving portion 17 projects through the housing 12 and is directly supported by the ball bearing 18 carried by the housing. Additionally, the driving section 17 supports the adjacent end of the shaft section 16 and for this purpose, it is provided with two bearing bushings 19 and 20, the former being adjacent the line of the ball bearing 18 and the latter being adjacent its outer end. The shaft section 16 has a reduced portion 16a engaging bearing bushing 19 and a second reduced portion 16b which extends through the major portion of the driving section 17 and engages bushing 20.

Just inside of the housing 12, a positive drive spring coupling of novel construction is provided to yieldingly connect the two shaft sections. One member of this coupling is formed integrally with the inner end of the driving shaft section 17, this consisting of a disk 21 with inwardly extending flange-like fingers 22 having a series of equally spaced tangentially disposed slots 23, in this case four in number.

The companion member of the coupling, shown at 24, consists of a member keyed onto the shaft section 16 and having on its inner side a hub-like extension 25, a flat disk 26 against which the ends of the fingers 22 bear, and on the outer side of the disk a substantially square block 27, the portions 25, 26 and 27 being integrally formed.

Secured to the four faces of the substantially square block 27 are four tangentially disposed springs or spring fingers 28, each consisting of a bundle of leaf springs secured to the block by a screw 29 alongside the outer face of the disk 26. These leaf spring fingers are tangentially disposed on the block and project outwardly beyond the latter in cantilever fashion, their outer ends being received in the slots 23 of the companion member 21 of the coupling.

Inwardly of the springs 28, the faces of the block 27 are cut away to provide clearance spaces indicated at 30 and on the outer sides of the springs backing plates 31 are provided, these being secured in place by the screws 29 and their outer portions being tapered outwardly to provide clearance spaces 32.

The clearance spaces 30 and 32 allow a predetermined flexing of the outer ends of the springs in both directions, and though the springs are stiff so as to transmit in the desired manner the driving torque between the coupling members, they will yield sufficiently to absorb the shock incident to sudden increase and decrease in speed, such as is encountered in airplane practice. Accordingly, the arrangement illustrated possesses to a high degree the feature of durability and reduces to a minimum the likelihood of breakage in the generator drive.

While I have shown only the preferred construction, I do not desire to be confined to the precise details and arrangements shown, but aim in my claims to cover all modifications which do not involve a departure from the spirit and scope of my invention.

Having thus described my invention, what I claim is:

1. A generator adapted particularly for use with a prime mover subject to sudden changes in speed, comprising a field frame with end housings, an armature and a drive for the latter comprising a pair of shaft sections coaxially arranged with a portion of one rotatably mounted inside a portion of the other and including a section carrying the armature and an outer driving section having a bearing in one of the end housings, and a positive drive spring coupling connecting the sections and located inside of the last-mentioned end housing and spaced from said armature.

2. A generator adapted particularly for use with a prime mover subject to sudden changes in speed, comprising a field frame having end housings, an armature and a drive for the latter, including two shaft sections, one being the main section supporting the armature and projecting out through one of the end housings and the other being a driving section projecting through and rotatably supported by the same end housing and receiving the end of the first-named section so as to support the latter, and a positive drive spring coupling between said sections and located between said end housing and the armature and spaced from the latter.

3. A generator adapted particularly for use with a prime mover subject to sudden changes in speed, comprising a field member having end housings, an armature and a drive for the latter, comprising two shaft sections, including a main section carrying the armature and an outer driving section, the outer section having a bearing in one of the end housings, and the inner section received in and having a bearing in the outer section adjacent the line of the first-named bearing, and a positive drive spring coupling inside said end housing spaced from said armature and yieldingly connecting the two shaft sections.

4. In a generator coupling for airplanes and the like, a shaft composed of two sections one received in and supported by the other, and a coupling between the sections of the shaft, comprising two members carried by the shaft sections, one having a plurality of substantially tangentially arranged spring fingers and the other having slots receiving the outer ends of the fingers, so as to operatively engage each of the latter on either of its opposite sides.

5. A spring coupling for airplane generators and the like, comprising two coupling members one having a block with a central shaft opening and having a plurality of faces, spring fingers secured to said faces and projecting tangentially outwardly in one direction beyond the same in cantilever fashion and having their outer ends spaced about the center of said opening, and the other member of the coupling having laterally projecting portions adapted to engage opposite sides of each spring finger at its outer end.

6. A coupling for airplane generators and the like, comprising two coupling members one having a block and a series of faces arranged about the center thereof, spring fingers of the leaf spring type secured to said faces and projecting substantially tangentially beyond the block in one direction progressively around the same, backing plates at the outer sides of the spring fingers, said backing plates and faces of the block having tapered portions which permit a flexing of the spring fingers in both directions from normal position, and the other coupling member having slots to receive the outer ends of said spring fingers for driving engagement with either side thereof.

7. A drive for generators subject to sudden changes in speed, comprising a pair of aligned shaft sections, and a cantilever leaf spring attached to one of said shaft sections and tangentially arranged, the other of said shaft sections carrying a cup-shaped member having a slot in its peripheral wall slidably receiving the outer end of said spring.

8. A flexible coupling for shafts mounted in alignment, comprising a block carried by one shaft, a disc adjacent one side of said block, a plurality of substantially tangentially arranged cantilever spring fingers attached at their inner ends to said block and engaging said disc, the other shaft carrying a disc closely paralleling said spring fingers on the side opposite their engagement with the first named disc, said second disc carrying at its periphery means for slidably engaging the outer ends of said spring fingers.

9. A generator adapted particularly for use with a prime mover subject to sudden changes in speed, comprising a field frame with end housings, an armature, and a drive for the latter comprising a pair of shaft sections coaxially arranged, said sections having radially enlarged portions within one of said housings independent of and spaced from said armature, and tangential spring coupling fingers connecting said enlarged portions.

In testimony whereof, I hereunto affix my signature,

BENNETT M. LEECE.